Figure 1:
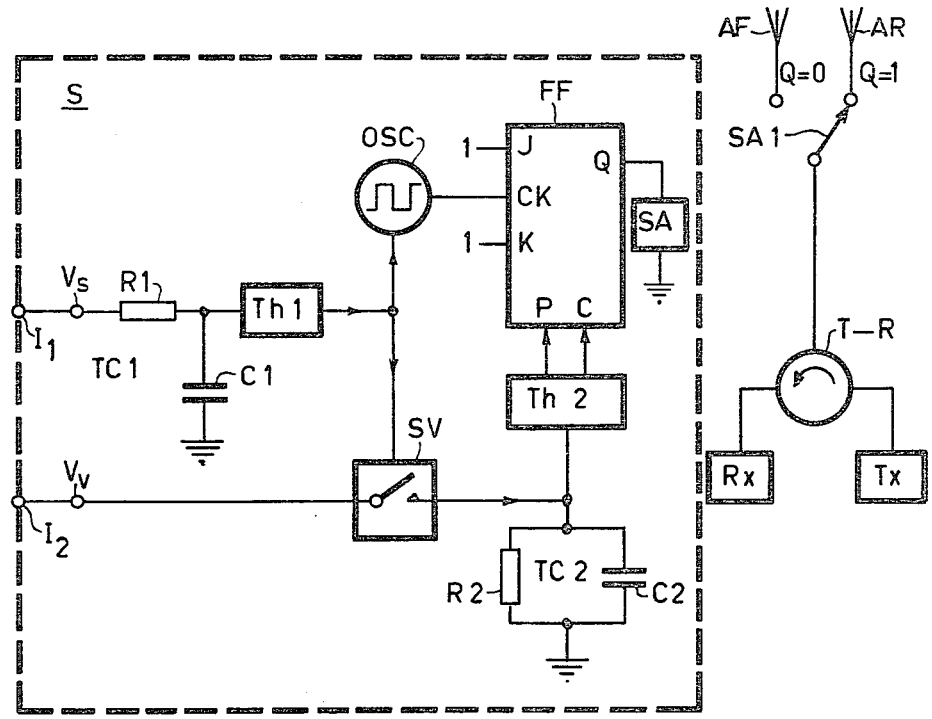

United States Patent [19]

Corbett

[11] 4,134,118
[45] Jan. 9, 1979

[54] AIRCRAFT ANTENNA-SWITCHING ARRANGEMENTS

[75] Inventor: Brian D. Corbett, East Grinstead, England

[73] Assignee: U.S. Philips Corporation, New York, N.Y.

[21] Appl. No.: 757,471

[22] Filed: Jan. 7, 1977

[30] Foreign Application Priority Data

Jan. 12, 1976 [GB] United Kingdom .................. 992/76

[51] Int. Cl.² ............................................ G01R 29/22
[52] U.S. Cl. .................................. 343/112 S; 325/56; 325/370
[58] Field of Search ............. 325/56, 370; 343/108 R, 343/5 LS, 112 S

[56] References Cited

U.S. PATENT DOCUMENTS

| | | | |
|---|---|---|---|
| 3,182,263 | 5/1965 | Gossard | 325/370 |
| 3,368,151 | 2/1968 | Verwey et al. | 325/370 |
| 3,671,967 | 6/1972 | Fries | 343/108 R |
| 3,693,088 | 9/1972 | Rustako, Jr. et al. | 325/56 |

Primary Examiner—Maynard R. Wilbur
Assistant Examiner—Richard E. Berger
Attorney, Agent, or Firm—Algy Tamoshunas

[57] ABSTRACT

A control system for an aircraft radio-navigation installation having forward-looking and rearward-looking antennas. The system provides the usual diversity reception facilities of "hunting" and then locking on to one antenna when an acceptable signal is received and in addition it selects the appropriate antenna with reference to the velocity and attitude of the aircraft relative to a ground transmitter even if the signal received on the inappropriate antenna is acceptable.

6 Claims, 2 Drawing Figures

AIRCRAFT ANTENNA-SWITCHING ARRANGEMENTS

This invention relates to an aircraft radio system of the kind, hereinafter referred to as "the kind described", having means for deriving a velocity signal indicating the sign and magnitude of the velocity of the aircraft relative to a ground-based radio transmitter, a space-diversity radio receiving system comprising a front antenna having a coverage forward and to the sides of the aircraft, a rear antenna having a coverage rearward and to the sides of the aircraft, a radio receiver and an antenna switch for switching the receiver between the two antennas. Such radio systems are used for ground-to-air communication where although the expected range between the aircraft and a ground transmitter may be fairly short, for example of the order of 15 miles or less, a single omnidirectional aircraft antenna may be unsatisfactory because of shielding effects caused by the aircraft structure.

An example of a radio system of the kind described is a landing and guidance system where in operation information concerning the position of an aircraft relative to a ground datum is sent to the aircraft by a ground-based transmitter: such an arrangement may function completely automatically. Ground transmissions may occur continuously or in bursts and may be initiated on the ground or, as described for example in British patent Specification No. 1,202,393, in response to interrogating signals from the aircraft.

One of the objects of this invention is to provide, for a radio system of the kind described, a control system in which the choice of antenna is in normal circumstances dependent upon the degree of acceptability, that is to say what has been termed the "quality," of the signals received from the ground transmitter.

Such acceptability or quality may be assessed in various ways according to the format in which information is presented to the aircraft receiver. One such assessment could depend upon the amplitude of the radio-frequency signals received from the ground transmitter. Another assessment could depend upon the rate at which validated code messages were received that is to say where the message from the ground transmitter is repeated periodically, either automatically or as the result of repeated interrogations, the proportion of those which are received in a valid, intelligible, form.

Space diversity systems are of course well known and one system of diversity reception for U.H.F. long-range communications is described in proceedings IRE 1955 page 1283: in this arrangement the quality of the signal is continuously monitored and when the quality of the signal received on one antenna falls below a preset threshold a switch turns off that antenna and selects the other: this switch is electronically operated with the aid of a multivibrator. Another arrangement is also described using a radio-frequency coaxial switch, again operated with the aid of a multivibrator.

U.S. Pat. No. 3,376,573 describes an arrangement where an aircraft is fitted with forward and rear antennas but these are for the purpose of measuring the yaw of an aircraft when approaching a runway and this is not a diversity system.

U.S. Pat. No. 3,671,967 discloses an ILS system having distributed receiving antennas and is concerned with an arrangement of processing signals received on the various antennas to provide a composite guidance signal having reduced noise. In general this approach requires independent radio-frequency receiver channels for each antenna.

A fairly full description of "A switched diversity receiving system for mobile radio" is to be found in IEEE Transactions on Communications Volume COM 21 No. 11 1973 at pages 1269–1275. Although this system is concerned with a link for mobile telephone communication for vehicles, it is interesting to note that this system includes an arrangement which prevents the antenna switching circuit from "hunting" during long fades encountered when the vehicle is moving slowly: in other words the antenna switching action is to some extent dependent upon the speed of the vehicle.

Consider, now an aircraft which is flying along a path passing more or less over a ground transmitter which may be situated near a runway system. During its flight towards the transmitter the aircraft would have been receiving signals on its forward antenna but when it has passed over the transmitter it is necessary to change over to the rearward antenna: however, it may well be that as the aircraft is so near the transmitter the signal strength on the forward antenna will for some time remain above the value at which the diversity system on the aircraft would start "hunting" to look for a stronger signal. Hence there may be a delay of seconds before the appropriate antenna is selected, together with an undesirable interruption of signals when the switch operates.

Thus, when the aircraft is flying towards the transmitter, reception should be through its forward antenna while when it is flying away from the transmitter reception should be through its rear antenna. Also, change-over from forward to rear antenna should occur when the sign of the velocity of the aircraft relative to the transmitter changes, that is to say, as soon as the aircraft changes from a course "towards" to a course "away from" the transmitter when the velocity of the aircraft relative to the transmitter exceeds a certain threshold value. Thus, during this "fly-over" manoeuvre, the amount of time during which the pilot ceases to receive information can be reduced.

Consider, next, an aircraft which is flying along a curved path which at some point will become tangential to a circle centred on the ground transmitter.

The velocity of the aircraft relative to the ground transmitter will tend towards zero as what may be termed the "tangential attitude" is approached. Ideally antenna changeover should occur when or shortly after reaching this attitude which corresponds to a change of sign of the relative velocity, which in these circumstances is quite low, from negative to positive or vice-versa.

Conversely, a high relative velocity implies that the aircraft is not close to or at a tangential attitude and if a high velocity is detected, it may be assumed that any loss of signals a short time thereafter will be due to a normal fading effect rather than an antenna polar diagram effect. In order to avoid further loss of signals due to an unnecessary change of antennas it is therefore beneficial to delay the hunting action of the diversity system by a greater amount when signals are lost at high relative velocities and it is a further object of the invention to provide an arrangement in which this facility is provided.

Accordingly, the present invention provides, for an aircraft radio system of the kind described, a control system responsive to the lack of reception through either antenna of a signal attaining a first standard of acceptability to switch the receiver alternately to the two antennas in a cyclic manner, and responsive to the reception through either antenna of a signal attaining the first standard to prevent further switching and maintain that antenna connected to the receiver, wherein the control means is also operative when the received signal subsequently falls below a second, lower, standard of acceptability to resume cyclic switching, and wherein, notwithstanding that the received signal has not fallen below the second standard, the control means is operative to switch from one antenna to the other if a velocity greater than a given threshold value and having a sign inappropriate to the antenna in use is detected.

Suitably, the control system comprises an oscillator for controlling cyclic switching of the antennas, a first threshold device controlled by a first voltage whose magnitude directly depends as herein defined upon the acceptability of the signal. The first threshold device is operable to inhibit operation of the oscillator when the voltage rises to a first threshold and also operable to remove such inhibition when the voltage subsequently falls to a second, lower threshold. The control system further includes a second threshold device controllable by a second voltage whose sign and magnitude respectively represent and are directly dependent upon the sign and magnitude of the velocity of the aircraft relative to the ground transmitter. The second threshold device is operable when a velocity-related voltage threshold is exceeded by the second voltage to keep the receiver switched to the front antenna when the aircraft is flying towards the ground transmitter and to keep the receiver switched to the rear antenna when the aircraft is flying away from the ground transmitter.

In this specification the definition of a first parameter, for example a voltage, as "directly depending" or being "directly dependent" upon a second parameter means that an increase or decrease in magnitude of the first parameter is consequent on a respective, but not necessarily proportional, increase or decrease of the second parameter. Further, unless the context indicates otherwise the sign of the first parameter is determined by, but is not necessarily the same as, the sign of the second parameter.

The system can be arranged so that at the moment the received signal falls below the second threshold of acceptability the resumption of cyclic switching is delayed by a period which is directly dependent upon the modulus of the relative velocity of the aircraft at that moment.

In this context it is to be understood that, as is apparent from the preceding discussion, "relative velocity" means the velocity of the aircraft relative to the ground transmitter.

Figure 2:
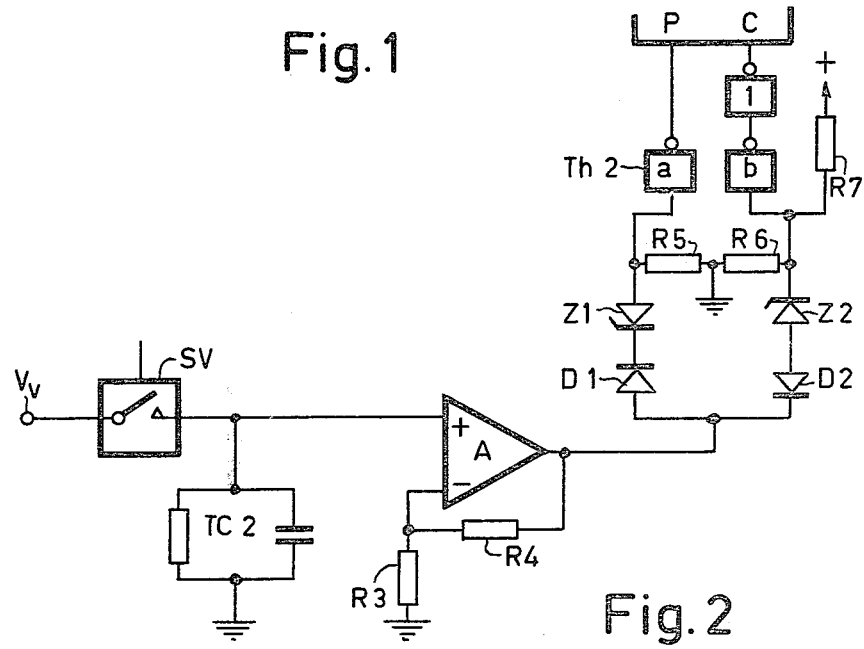

An embodiment of the invention will now be described by way of example with reference to the accompanying diagrammatic drawings in which:

FIGS. 1 and 2 are diagrams of a system embodying the invention.

FIG. 1 illustrates in block diagram form a control system embodying the invention. The control system has two inputs $I_1$ and $I_2$. Input $I_1$ receives a voltage $V_s$ which is derived from signals received by the receiver Rx and indicates the acceptability of the received signal. As discussed above this acceptability could depend upon the amplitude of the signals received from the transmitter in which the voltage $V_s$ could suitably be, or be derived from, the AGC voltage of the receiver in conjunction with suitable recognition criteria. Where the assessment of acceptability depends upon the message rate, this could be in the form of pulses, one or more for each validated message received, so that, as with the AGC system, the average voltage during any period of time would represent and would directly depend upon, that is to say, would increase or decrease with the acceptability or "quality" of the received messages.

The other input $I_2$ receives a voltage $V_y$ which represents the velocity of the aircraft relative to the transmitter. This voltage will often be present in the DME system of the aircraft but if it is not it can be derived by simple differentiation with respect to time of successive range measurements made by the DME system.

Considering now the input voltage $V_s$, this is applied to a time constant device TC1 which conveniently is in the form of a simple resistor-capacitor section R1, C1. Device TC1 serves to average or integrate, i.e. smooth, the voltage $V_s$ which, as discussed above, may be in the form of pulses. When this voltage is already in smoothed analogue form, for example when it is the AGC voltage of the receiver Rx, TC1 may be omitted. From TC1 the voltage V is applied through a threshold trigger, Th1, which may be a Schmitt trigger, from which a logic-0 control signal is derived if the average voltage $V_s$ exceeds a predetermined first magnitude indicating that the received signal has attained a first standard of acceptability.

The logic-0 control signal is used to inhibit an oscillator OSC which otherwise generates clock pulses at a frequency, for example, of 0.5 Hz. The clock pulses, in the absence of the inhibiting signal, are used to change the state of a flip-flop FF. FF may be, for example, half of a dual JK flip-flop type SN 7476 with the J and K terminals connected to logic-1. Provided that the received signals fail to meet the acceptability criterion imposed by the threshold Th1, the flip-flop FF will generate a square waveform at its output Q. This output drives an antenna relay SA which, at contacts SA1, causes the front antenna to be selected when the relay coil is not energized and the rear antenna when Q is at logic-1.

The selected antenna is connected through SA1 to the receiver Rx by way of a circulator, or other form of transmit-receive module, T-R since in this particular embodiment it is assumed that each of the antenna is used for transmission of interrogations as well as reception of replies.

When the averaged value of $V_s$ exceeds the threshold voltage of Th1, which means that the signal from the ground transmitter incident upon one or other of the antennas has attained the first standard of acceptability, then Th1 will be triggered and will pass a logic-0 control voltage to an inhibit terminal of the oscillator to inhibit further switching and the relay SA will not change its state thereafter so that the antenna which then is connected to the T-R module will remain so connected. This state of affairs will be maintained provided that the voltage $V_s$ remains at or above the voltage needed to retain the threshold trigger Th1 in its triggered condition. This trigger of course has a degree of "backlash" that is to say, it is so arranged that the voltage required for it to trigger is greater than that required to maintain it in the triggered condition. Therefore, it is not until the voltage $V_s$ has fallen to a second level, below that at which Th1 was actuated, that Th1 reverts to its original condition and the "inhibit" state is removed from the oscillator OSC. Following the removal of this inhibiting signal the flip-flop FF recommences to operate the relay SA cyclically at a frequency determined by the oscillator OSC. The oscillator is arranged to generate its first clock pulse with a fixed delay following the removal of the inhibiting signal.

The arrangements described so far will, of course, be recognised as being a fairly conventional approach to providing a space diversity system having well known characteristics.

Consider now the velocity signal $V_y$ which indicates the velocity of the aircraft relative to the ground station transmitter. This signal is applied to a switch SV, which may be an analog switch type DG 200 made by SILICONIX a United States company, and which is under the control of the output from the threshold trigger Th1. When the signal acceptability $V_s$ exceeds the threshold imposed by Th1 so that Th1 passes an inhibiting signal to the clock oscillator, the same control signal is also passed from Th1 to the switch SV so as to close it and allow the voltage $V_y$ to be applied to a double-threshold device Th2. This portion of the arrangement also includes a second time constant arrangement TC2 the purpose of which will be explained later.

Assume that an aircraft is flying towards the ground station transmitter and is fairly near it so that the signal $V_s$ exceeds the threshold Th1 when the rear antenna happens to be connected and Q is at logic-1. The velocity signal $V_y$ has a high negative value and is being passed through switch SV to device Th2. This device is arranged to respond if the magnitude of the velocity signal is outside a range between two thresholds of opposite sign. The negative threshold represents a certain low speed towards the transmitter and the positive threshold a similar speed away from the transmitter. A high negative velocity will apply a "clear" signal to the flip-flop FF. Thus in this example the chance acquisition of signals on the wrong antenna will be overridden by the velocity signal when this builds up in TC2 following closure of SV, Q will go to logic-0, the relay will release and selection of the front antenna will thereby be enforced as long as the velocity maintains a high negative value. A similar mechanism operates to force selection of the rear antenna by way of the "preset" terminal of the flip-flop when a high positive value of the velocity is detected.

When the aircraft flies over the transmitter so that the velocity signal passes from the negative to the positive threshold, the trigger circuit Th2 will respond by changing the "clear" signal to the flip-flop into a "preset" signal. As soon as the "preset" signal is generated the flip-flop will change state and the relay SA will change over to the rear antenna AR and will remain there for as long as the velocity signal exceeds the positive velocity threshold.

The time constant circuit TC2 serves to delay the disappearance of an input to Th2, if, due to signal failure, switch SV is opened at high velocities. This in turn delays the disappearance of the "front" or "rear" override commands supplied to the flip-flop if the signal fades when the velocity of the aircraft relative to the transmitter, irrespective of the sign of that velocity, is high. The duration of this delay increases with aircraft velocity at the moment when signals are lost.

The purpose of this variable delay is to increase the probability of regaining signals quickly. The probability of regaining signals as a result of changing to the alternate antenna becomes progressively smaller as the velocity at the moment of signal failure increases. With high velocities of either sign the triggering voltage at Th2 decays exponentially with time constant TC2 when SV opens. Hence Th2 will relapse from the triggered state after a delay which is proportional to the logarithm of the velocity stored in TC2 at the moment when SV opens.

Referring to FIG. 2 this shows in greater detail part of the arrangement illustrated in FIG. 1. Here, the output from the analog switch SV is amplified in an amplifier A from which it is passed to the double-threshold device Th2 of FIG. 1. For the sake of illustration it has here been assumed that the sign of the velocity voltage $V_y$ is dependent on the sign of the aircraft velocity relative to the ground transmitter. In other words, if the aircraft is flying towards the transmitter $V_y$ is negative and if it is flying away from the transmitter $V_y$ is positive. Further, it is assumed that the magnitude of $V_y$ increases with, for example is directly proportional to, the velocity of the aircraft relative to the transmitter. Such a voltage could for example be derived from a distance-measuring equipment on the aircraft by obtaining the time-derivative of successive range measurements. It may be that the input voltage $V_y$ is offset from zero, for example instead of being what has been defined herein as directly dependent upon and varying in what may be termed a symmetrical way from some voltage $-V$ representing maximum negative velocity through zero voltage representing tangential attitude and zero velocity to a voltage $+V$ representing maximum positive velocity, it may vary say from zero voltage representing maximum negative velocity through a voltage $+V$ representing a tangential attitude to a voltage $+2V$ representing a maximum positive velocity. The required symmetrical relationship can then be obtained very simply by applying this asymmetrical-characteristic voltage to an amplifier stage having its working point biassed or otherwise adjusted. Whatever therefore the initial characteristics of $V_y$, it will be understood that there appears at the terminal $V_y$ and, similarly, at the output of the amplifier A a voltage whose sign indicates the direction of the aircraft relative to the transmitter while its magnitude is a measure of the velocity of the aircraft relative to the transmitter.

The double-threshold device, see Th2 in FIG. 1, is provided by two trigger circuits Th2a and Th2b in association with the diode, zener-diode and resistor networks D1, Z1, R5 and D2, Z2, R6, R7 respectively. When the voltage derived from the amplifier A, is positive then a triggering voltage will be developed across R5, provided that the threshold set by Z1 is exceeded. If the voltage derived from the amplifier A is negative then the positive bias applied through R7 to Th2b will be neutralized provided the threshold set by Z2 is exceeded. The outputs of the trigger circuits are associated with the "clear" terminal C and the "preset" terminal P of the flip-flop in such a way that a negative velocity voltage which exceeds the threshold Z1 causes the flip-flop to be cleared thus releasing the relay SA, while a positive velocity voltage which exceeds the threshold Z2 presets the flip-flop and causes the relay SA to be energized.

What we claim is:

1. A control apparatus for a space diversity radio system for a mobile station such as an aircraft, said system having a first antenna for receiving signals from a source of radio signals located in front of the mobile station and a second antenna for receiving signals from a source located to the rear of the mobile station, a receiver and switching means for connecting the receiver to one or the other of the first and second antennas, said control apparatus comprising:

first means for comparing a first signal representative of a signal received through one of the antennas with a first value representative of an acceptable received signal, means responsive to said first means for activating said switching means when said first signal falls below said first value to thereby connect the receiver to the other antenna, second means for comparing a second signal indicative of approach or recessional velocity of the mobile station relative to the source of radio signals with a second and third value representative of a predetermined approach velocity and a predetermined recessional velocity, respectively, said second means being coupled and operative to cause said activating means to activate said switching means and connect said first antenna to said receiver when said second signal is indicative of an approach velocity exceeding said second value and connect said receiver to said second antenna when said second signal is indicative of an recessional velocity exceeding said third value regardless of the value of said first signal.

2. The control apparatus according to claim 1 wherein said activating means includes means coupled to said first means for generating switching signals for cyclically activating said switching means so that said first and second antennas are alternatively connected to the receiver when said first signal falls below said first value.

3. The control apparatus according to claim 2 including means for delaying the generation of said switching signals by said generating means by a period directly dependent on the magnitude of the velocity of the mobile station at the time said first signal falls below said first value.

4. The control apparatus according to claim 3 wherein said generating means includes an oscillator for producing said switching signals, said first means includes a first threshold device controlled by said first signal, said first threshold device having an output connected to said oscillator and producing one output signal which inhibits the oscillator from generating said switching signal when said first signal exceeds a first threshold and another output signal which permits said oscillator to resume generating said switching signals when said first signal falls below a second threshold which is lower than said first threshold and which corresponds to said first value.

5. The control apparatus according to claim 4 including a switch coupled to said output of said first threshold device for connecting said second signal to said second means, said switch being controlled by said first threshold device to close and connect said second signal to said second means in the presence of said one output signal and to open and disconnect said second signal from said first means in the presence of said another output signal.

6. The control apparatus according to claim 5 wherein said second signal is a voltage with a magnitude dependent on the velocity of the mobile station relative to said source and a sign dependent on whether the mobile station is approaching or receeding from said source, said second means including a second threshold device having an input connected to said switch and responsive to said voltage to produce a first output signal when said voltage exceeds a third threshold corresponding to said second value and a second output signal when said voltage exceeds a fourth threshold corresponding to said third value, and said activating means includes a flip-flop having an input connected to said oscillator, a further input connected to said output of said threshold device and an output for delivering an activating signal to said switching means.

* * * * *